United States Patent [19]
Rosenquist

[11] Patent Number: 5,895,057
[45] Date of Patent: Apr. 20, 1999

[54] HEAD GASKET ASSEMBLY FOR VERY CLOSELY ADJACENT CYLINDER BORES WITH STABILIZED ARMORING AND METHOD OF MAKING SAME

[75] Inventor: Gerald A. Rosenquist, Lake Zurich, Ill.

[73] Assignee: Fel-Pro Incorporated, Skokie, Ill.

[21] Appl. No.: 08/819,214

[22] Filed: Mar. 17, 1997

[51] Int. Cl.⁶ .............................. F16J 15/08; F02F 11/00
[52] U.S. Cl. .............................. 277/598; 277/601
[58] Field of Search ............................ 277/601, 598

[56] References Cited

U.S. PATENT DOCUMENTS

| | | | |
|---|---|---|---|
| 1,600,386 | 9/1926 | Bailey | 277/601 |
| 1,847,729 | 3/1932 | Shaw . | |
| 3,532,349 | 10/1970 | Czernik | 277/601 X |
| 4,083,570 | 4/1978 | Sagawara . | |
| 4,330,585 | 5/1982 | Eyrard et al. | 277/601 |
| 4,605,236 | 8/1986 | Tsuchihashi et al. . | |
| 4,662,643 | 5/1987 | Rosenquist . | |
| 4,669,740 | 6/1987 | Schwenkel | 277/601 |
| 4,711,456 | 12/1987 | Udagawa | 277/601 |
| 4,767,124 | 8/1988 | Udagawa | 277/601 |

*Primary Examiner*—Eric J. Nicholson
*Assistant Examiner*—William Ackerman
*Attorney, Agent, or Firm*—Brinks Hofer Gilson & Lione

[57] ABSTRACT

A head gasket assembly for an engine with minimal space between adjacent cylinder bores. Armoring including a bridge between adjacent combustion openings is provided with the legs of the combustion openings enclosing wire rings and being welded to each other in the zone of adjacency. The wires are stabilized and maintained in permanent close adjacency.

7 Claims, 1 Drawing Sheet

5,895,057

HEAD GASKET ASSEMBLY FOR VERY CLOSELY ADJACENT CYLINDER BORES WITH STABILIZED ARMORING AND METHOD OF MAKING SAME

BACKGROUND OF THE INVENTION

To conserve weight and space in engine blocks, while maintaining or improving performance, it is desirable to minimize the spacing between adjacent cylinder bores. However, the closer together the cylinder bores are, the more difficult it is to provide a stable effective seal with available head gasket technology, particularly in the zones at which the cylinder bores are most closely adjacent.

One of the concerns with head gaskets where cylinder bores are closely adjacent is that the gasket body portion located between the bores is relied on to provide a seal and, where armoring is used, to mount the armor, thereby to provide an effective seal at the zone of adjacency. As the width of the gasket between the bores decreases, the gasket body becomes increasingly fragile. Thus it may break away altogether, or, if it is a typical laminated gasket body, it may delaminate and thereby become ineffective for the sealing functions for which it was designed. Further, in applications where temperatures are very high, existing close bore gasket constructions may be inadequate to provide a stable and consistent seal.

SUMMARY OF THE INVENTION

In accordance with the present invention an improved head gasket assembly for an internal combustion engine and having stabilized armoring is provided. The head gasket assembly comprises a generally flat main gasket body defining at least one pair of adjacent combustion openings therein, armoring for the combustion openings, the armoring comprising pairs of U-shaped annular armor sections, each of the armor sections having a pair of legs embracing one of the combustion openings, the armoring including a bridge connecting adjacent pairs of armor sections. A wire is disposed in each annular armor section, the wires in the zone of adjacency being in close proximity but spaced from each other, and in each zone of adjacency, a bridge and one leg of each of a pair of adjacent armors defining an elongated enclosed sheath. A weld for permanently securing one leg of each pair to each other is provided, whereby the wires are stabilized in close proximity but spaced from each other to provide for spaced adjacent seals with an engine block in the zone of adjacency.

In a preferred form the legs of adjacent armors overlap and are permanently secured to each other by the weld. Preferably the wires are steel wires.

A method of making an automotive head gasket assembly in accordance with this invention comprises the steps of providing a generally flat main gasket body configured for sealing communication with at least two cylinder bores in an engine block, the gasket body defining at least one pair of adjacent combustion openings therein, providing integral armoring for the combustion openings, the armoring comprising at least one pair of U-shaped annular armor sections, each of the armor sections having a pair of legs embracing the peripheral edge of one of the combustion openings, and, in the zone of adjacency of each pair of adjacent combustion openings, one leg of each of a pair of adjacent armor sections merging in a bridge connecting an adjacent pair of armor sections, providing a wire in each annular armor section, which wires, in the zone of adjacency, are in close proximity but spaced from each other, and in each zone of adjacency forming an elongated enclosed sheath for a pair of the wires from each of a bridge and one leg of each of a pair of adjacent armors, and welding one leg of each pair to each other, and whereby said wires are permanently stabilized and maintained in close proximity but spaced from each other thereby.

Preferably the legs of adjacent armors overlap and are permanently secured to each other by welding.

Further objects, features and advantages of the present invention will become apparent from the following description and drawings.

DESCRIPTION OF THE PREFERRED EMBODIMENT

Figure 1:
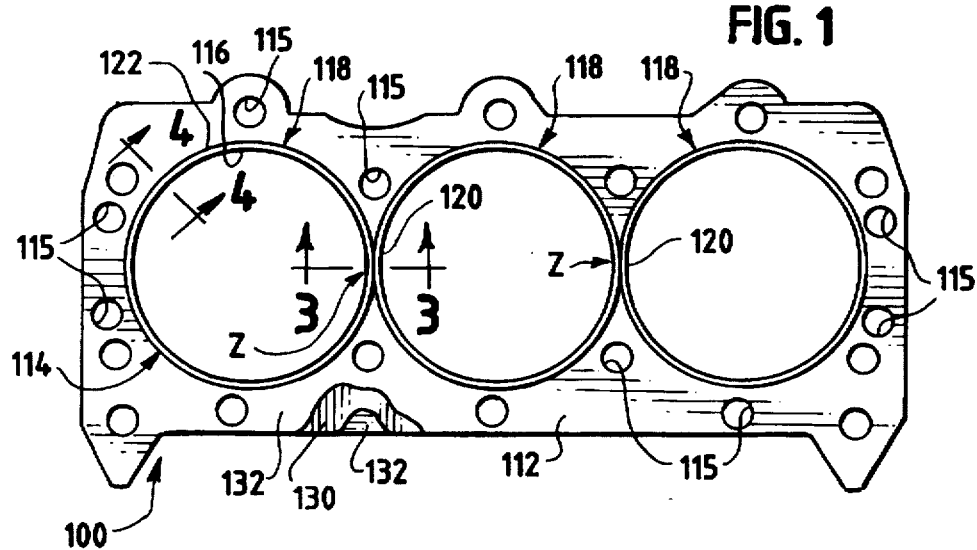
FIG. 1 is a plan view of a head gasket in accordance with the present invention.
Figure 2:
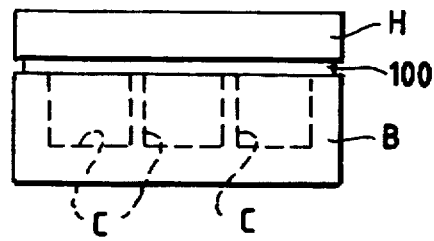
FIG. 2 is a schematic side elevational view of an internal combustion engine assembly in which the gasket of FIG. 1 may be used.
Figure 4:
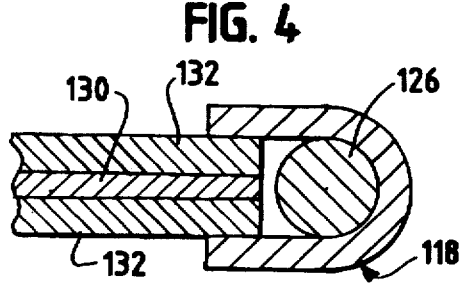
FIG. 4 is a cross-sectional view, taken substantially along line 4—4 of FIG. 1.
Figure 5:
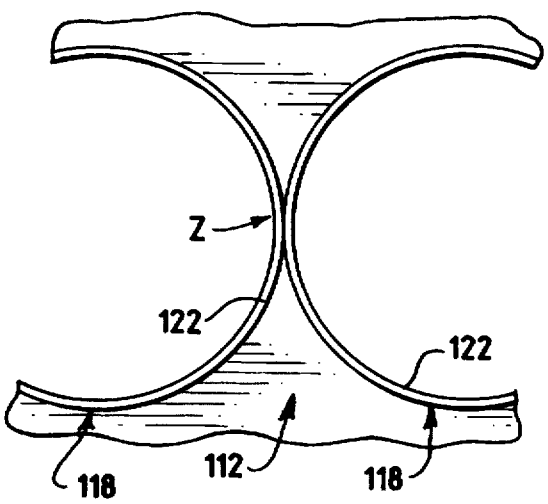
FIG. 5 is a fragmentary plan view of a portion of FIG. 1 which has been enlarged for ease of understanding.

Referring now to the drawings, a head gasket assembly 100 of the present invention is seen to comprise a generally flat main gasket body 112 which defines a plurality of combustion openings 116, suitable oil, water and bolt openings 115, and armoring 114 for the combustion openings 116. In FIG. 1 a head gasket assembly 100 having three combustion openings 116 is shown for sealing communication between an engine block B having cylinder bores C and a head H (see FIG. 2), typically for one side of a V-6 engine. Thus, the head gasket assembly armoring 114 may desirably be formed to cooperate with three combustion openings. It is clear that any multiple cylinder engine where at least two cylinder bores are closely adjacent to each other may benefit from the practice of the present invention. As such, a V-8 engine having four combustion openings in each head gasket assembly is also contemplated As best seen in FIGS. 1 and 5, the armoring 114 comprises three circular U-shaped annular armor sections 118. Each armor section comprises a pair of legs (FIG. 4). One of the legs of each of a pair of adjacent armors merges in a bridge 120 in a zone adjacent to the next adjacent armor section 118 (see FIG. 3). Bridges 120 connect the armor sections to form a unitary set of the armor sections 118 comprising the armoring 114.

Prior to assembly with the main body 112, each of the armor sections 118 defines a first leg 122 which initially (and before forming around a wire ring or wire) extends generally vertically away from the bridge 120 of the armor section. When in that position, the armor sections 118 are adapted to receive wires 126 which, in the zones of adjacency Z, are spaced but in close proximity to each other. The wires 126 are preferably circular in cross-section, although other suitable shapes may be used as well. The assembled armoring sections 118 and the wires 126 comprising the armoring 114 are adapted to be juxtaposed with the gasket body 112, following which the legs 122 are bent over, as is conventional, to define U-shaped annuli about and embracing the peripheral edges E (see FIG. 4) of the combustion openings 116, thereby to secure the armoring 114 to the main body 112 and to provide an integrated head gasket assembly 110. In the embodiment shown, the combustion openings 116 are generally circular. As such the armor sections 118 which embrace the peripheral edges E of the openings 116 are also generally circular.

The main gasket body 112 typically may comprise a laminate, such as of an imperforate metallic core 130, and a pair of self-sustaining facings or facing sheets 132 (see FIGS. 1 and 4). Facing sheets 132 are a fiber reinforced composite and are laminated to core 130. The most popular and frequently used facings incorporate aramid or glass fibers and utilize nitrile, neoprene or polyacrylic elastomers to provide the self-sustaining facings. In the embodiment illustrated, the facings may have a thickness of about 0.015 inch, although, of course, this may vary with the application. Facing sheets 132 generally resist degradation by oils and coolants, retain torque, minimize extrusion, and exhibit heat resistance.

The main gasket body 112 may be die cut or blanked out, such as with a stamping machine, punch press or other suitable form of equipment to provide three combustion openings, bolt holes, and a plurality of fluid flow passageways. A typical gasket assembly body having the configuration shown in FIG. 1 may have a thickness of about 0.054 inch. Other configurations and thicknesses may be used depending upon the configuration and requirements of the particular internal combustion engine with which a gasket assembly of the present invention is to be used.

In a preferred form, a gasket of the present invention is designed to be used in an environment in which the cylinder bores are as close as 0.12 inch apart. Thus the deck or sealing surface provided by the block B at the zones of adjacency Z which are available for each of the adjacent armor sections may be as little as 0.06 to 0.065 inch. Typically, therefore, the gasket body 112 is omitted or eliminated in the zone of adjacency Z, and the seal therefore entirely depends upon the effect of the wires 126 in association with the armoring. Also, because the deck surface between adjacent bores is so narrow, the armoring and the associated wire rings must be precisely aligned with the block deck or sealing surface, and must be stabilized so they are retained exactly in their confronting relationship to the deck during the service life of the head gasket assembly.

It will also be apparent that when cylinder bores C are so very close to each other at their closest zones of adjacency, the temperatures encountered will tend to be elevated as compared to the temperatures encountered at the zone of adjacency of much more widely spaced cylinder bores. Thus, in environments where the cylinder bores C are very close at their zones of adjacency, wire rings which are relatively stiff rather than malleable and conformable, are desirably used. Thus, in accordance with the present invention, wires, such as low carbon or stainless steel wires, rather than malleable copper wires or the like, are preferably employed. However, in environments where the available clampload and the engine components make it desirable or permissible, under some circumstances more malleable copper wires may be employed.

Finally, the extreme service conditions of heat and load, and the very narrow deck surface of the block in the zone of adjacency makes prior art gaskets, even those of the specific embodiments of U.S. Pat. No. 4,662,643, difficult to employ effectively. Thus, in accordance with the present invention, stiffer wire rings, such as steel wire rings, are preferably used and disposed within the armor sections 118. Additionally, in the zones of adjacency Z of adjacent cylinder bores C, the legs 122 of the adjacent armor sections 118 are welded to each other, thereby to provide an elongated enclosed sheath for the wires 126 therein, to stabilize the armoring at the zone of adjacency, and to restrain the wires against lateral movement relative to the sealing surface or deck. In other constructions, such as those of U.S. Pat. No. 4,662,643, the wires are also ensheathed, but the seal relies on the deformation of oversized malleable wires into engagement with each other; further, the armor sections are free to unfold and deform. In such constructions, because the armor sections may unfold or expand in the zone of adjacency, the expansion or unfolding tends to allow the wires to move. Where the cylinder bores are as closely adjacent as those described above, movement of the wires could well result in failure of the seal, hence of the engine.

Thus, a head gasket assembly 100 of the present invention includes a weld W for permanently securing, stabilizing and locking and joining the legs 122 to each other, thereby preventing the legs from spreading, and also preventing the associated wires 126 from moving relative to each other and laterally relative to the confronting sealing surface or deck of the block. Additionally, the wire rings 126 in accordance with the present invention remain spaced from each other in the zone of adjacency Z so that neither tends to displace the other laterally. Each wire ring, therefore, separately and precisely provides for a seal with the deck at the location at which such seals have been designed to occur, namely at spaced adjacent locations on the block deck between the combustion openings in the zone of adjacency.

Figure 6:
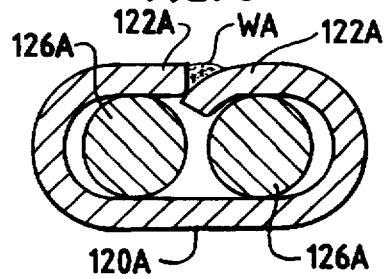
FIG. 6 is a cross-sectional view like FIG. 3, but of an embodiment in which legs overlap in the zone of adjacency rather than butting.

In one form of the invention, the weld W is provided by laser welding adjacent confronting butting edges 123 of the armor legs 122 to each other. That is an alternative to providing welded leg areas which are overlapped in the zone of adjacency. Where overlapping is used, as illustrated by FIG. 6 (in which like numbers with the suffix A added are used), the volume of material within the armor in the zone of closest adjacency of the cylinder bores C including overlapping leg portions should be maintained so that it does not tend to produce undue stress on the wires or which would tend to cause movement of the wire rings. It is also important that the individual wire rings 126 function to create seals individually along the block deck directly beneath the individual wires, unlike the preferred approach of the specific embodiments of the design of U.S. Pat. No. 4,662,643 where the seal in part depended upon filling the internal volume of the armoring in the zone of adjacency and the seal with the deck then tended to be produced beneath the "merged" rings.

Figure 3:
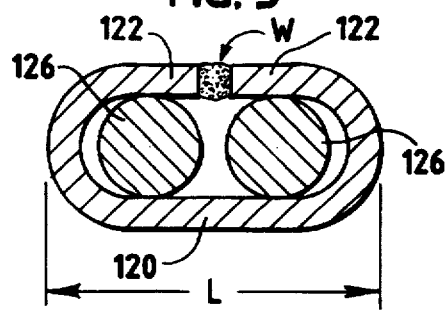
FIG. 3 is a cross-sectional view taken substantially along line 3—3 of FIG. 1.

A typical gasket construction in accordance with the present invention comprises a 0.007 inch 321 stainless steel U-shaped armoring 114 which, as illustrated in FIG. 3, has a width L of 0.12 inch at the position of closest adjacency of the bores. The wires 126 are 0.046 low carbon steel wires and the welded zone is laser welded to produce the butt weld W. As illustrated by FIG. 5, the leg edges which are to be butt welded are straight in the zone of adjacency Z for a length of approximately 0.85 inch in an engine in which the cylinder bores are about 4.720 inches in diameter. In this construction, as represented by FIG. 3, the total internal cross-sectional area is somewhat greater than the total wire ring cross-sectional area, thereby preventing in use, undue stresses on the armoring. The embodiment of FIG. 6 uses overlapping legs in the zone of adjacency.

Gaskets in accordance with the present invention are especially useful in racing engines where maximum bore size is usually deemed to be desirable. Such gaskets, however, may be employed in other environments as well.

It will be apparent to those skilled in the art that variations of the disclosed embodiments may be made without departing from the spirit and scope of the present invention. Accordingly, the invention is not intended to be limited to the embodiments shown or described, except as may be made necessary by the appended claims.

What is claimed is:

1. A head gasket assembly for sealing communication with at least two adjacent cylinder bores in an engine block, said gasket assembly comprising:
   a) a generally flat main gasket body defining at least two adjacent combustion openings therein and having a zone of adjacency between said adjacent combustion openings,
   b) armoring for said combustion openings, said armoring comprising U-shaped annular armor sections, each of said armor sections having a pair of legs embracing said main gasket body adjacent said combustion openings, and, in the zone of adjacency, said armoring including a bridge connecting adjacent armor sections,
   c) a wire disposed in each of said armor sections, said wires in the zone of adjacency being in close proximity but spaced from each other, and in each zone of adjacency said bridge and one leg of adjacent armor sections defining an elongated enclosed sheath, and
   d) a weld permanently securing said one leg of each of said adjacent armor sections to each other, whereby said wires are stabilized in close proximity but spaced from each other to provide for spaced adjacent seals with said engine block in the zone of adjacency.

2. The head gasket assembly of claim 1, and wherein the legs of the adjacent armors overlap and are permanently secured to each other by said weld.

3. The head gasket assembly of claim 1, and wherein said wires are steel wires.

4. An engine assembly having a block with at least two closely adjacent cylinder bores, a head and a head gasket assembly therebetween for providing sealing communication for the head and the block, said head gasket assembly comprising:
   a) a gasket body defining adjacent combustion openings therein inline with the cylinder bores in said block and having a zone of adjacency between said adjacent combustion openings,
   b) armoring for said combustion openings, said armoring comprising U-shaped annular armor sections, each of said armor sections having a pair of legs embracing said main gasket body adjacent said combustion openings, and in the zone of adjacency said armoring including a bridge connecting adjacent armor sections,
   c) a wire disposed in each of said sections, said wires in the zone of adjacency being in close proximity but spaced from each other, and in each zone of adjacency said bridge and one leg of each of said adjacent armor sections defining an elongated enclosed sheath, and
   d) a weld permanently securing said one leg of each of said adjacent armor sections to each other, whereby said wires are stabilized in close proximity but spaced from each other to provide spaced adjacent seals with said engine block in the zone of adjacency.

5. A method of making an automotive head gasket assembly comprising the steps of:
   a) providing a generally flat main gasket body configured for sealing communication with at least two cylinder bores in an engine block, said gasket body defining at least two adjacent combustion openings therein and having a zone of adjacency between said adjacent combustion openings,
   b) providing integral armoring for said combustion openings, said armoring comprising U-shaped annular armor sections, each of said armor sections having a pair of legs embracing said main gasket body adjacent said combustion openings, and one leg of each of said adjacent armor sections merging in a bridge in the zone of adjacency,
   c) providing a wire in each of said armor sections, said wires being in close proximity but spaced from each other in the zone of adjacency,
   d) in each zone of adjacency, forming an elongated enclosed sheath for a pair of said wires from said bridge and one leg of each of said adjacent armor sections, and
   e) welding said one leg of adjacent armor sections to each other, whereby said wires are permanently stabilized and maintained in close proximity but spaced from each other.

6. The method of claim 5, and wherein the legs of the adjacent armors overlap and are permanently secured to each other by said welding.

7. The method of claim 5, and wherein said wires are steel wires.

* * * * *